United States Patent [19]

Muchnik et al.

[11] Patent Number: 4,625,215

[45] Date of Patent: Nov. 25, 1986

[54] OPTICAL STORAGE STRUCTURE

[75] Inventors: Boris J. Muchnik; Fred W. Spong, both of Boulder, Colo.

[73] Assignee: Storage Technology Corporation, Louisville, Colo.

[21] Appl. No.: 628,200

[22] Filed: Jul. 6, 1984

[51] Int. Cl.[4] .................. G01D 15/14; G01D 15/34
[52] U.S. Cl. .............................. 346/25; 346/75; 346/135.1; 369/284; 369/286; 369/288; 430/270; 430/945; 428/65; 428/64
[58] Field of Search .............. 428/64, 65; 346/135.1, 346/25, 75; 369/284, 286, 288; 430/945, 270

[56] References Cited

U.S. PATENT DOCUMENTS

| 4,370,391 | 1/1983 | Mori et al. | 428/697 |
| 4,403,231 | 9/1983 | Ando et al. | 346/135.1 |
| 4,451,915 | 5/1984 | La Budde et al. | 346/135.1 X |
| 4,461,807 | 7/1984 | Mori et al. | 428/209 X |

Primary Examiner—Alexander S. Thomas
Attorney, Agent, or Firm—Yuter, Rosen & Dainow

[57] ABSTRACT

An information storage device in combination with a radiation recording structure comprising a substrate, a recording layer, a thin electrically conductive overlayer on the outer surface of the recording structure and a neutralizing means for maintaining said over-layer at a neutral electrical potential.

7 Claims, 3 Drawing Figures

OPTICAL STORAGE STRUCTURE

This invention relates to optical storage devices of the type comprising a rotatable disk having an active structure enabling variation of optical properties by means of focused write radiation, such as a laser beam, and reading data stored thereon by means of focused read radiation beam.

An optical structure of the above type is disclosed, for example, in U.S. application Ser. No. 499,666, Boris Muchnik, filed May 31, 1983, and assigned to the present assignee. The present invention is directed to the provision of an optical recording structure of this type incorporating a rotatable substrate, and a layer for protecting the active layer and defocusing any dust particles that may inadvertently fall upon the structure.

In such optical structures, the dust defocusing layer is relatively thick since the dust particles must be removed from the focal plane by multiples of quarter wavelengths in order to achieve the defocusing effects. The cost of manufacturing such layers, as well as the additional time involved in such manufacturing, are both significant factors.

In addition, the defocusing layer does not prevent the presence of very large particles of dust from impeding the optical path of the read and write beams.

Further, the polymer composition of the defocusing layer in contrast with the metallic substrates of such structures results in inherent thermal instabilities, avoidance of which is desirable.

It is accordingly the object of this invention to achieve the result of a dust defocusing layer without the attendant disadvantages of cost and time.

It is a further object of the invention to provide an optical storage device which eliminates the effects attendant upon larger dust particles.

It is another object of the invention to eliminate particle interference from the optical path without providing inherent thermal instability.

Briefly stated, in accordance with the invention, a preferably disk shaped substrate, for example, of aluminum or plastic, is provided with a planarizing layer, for example a thin coating of acrylic material, to provide an optically smooth surface. A reflective layer for the structure is deposited on the planarizing layer, and thereupon a traditional trilayer or three layer, structure, such as disclosed in application Ser. No. 499,666 is deposited. The phase layer, for example of a fluorocarbon, is tuned, i.e., it has a thickness such that destructive interference occurs between radiation reflected from the active layer and radiation transmitted by the active layer and radiation reflected from the reflective layer and transmitted by the active layer. This destructive interference phenomenon occurs for both read and write beams. It enhances the write sensitivity by increasing the coupling of the write beam energy to the active layer. It also enhances the read signal by increasing the reflectivity contrast between written marks and unwritten surrounding regions.

In order to eliminate the effect of any dust or small particles falling on the structure, a thin metallic over-layer is provided on the structure, preferably by vacuum deposition of a metal on the matrix layer. The phase and matrix layers, and the new over-layer are transparent to radiation of the read and write frequencies. To prevent dust attracting static buildup, the over-layer is maintained at a neutral or ground potential by means of a conductive path between the over-layer and ground. The path is provided by means of a conductive stream of charged particles impinging on the over-layer from a grounded emitter. By making the stream a flow of ionized air, the discharging effect as well as a dust dislodging air flow are both achieved.

In order that the invention may be more clearly understood it will now be disclosed in greater detail with reference to the accompanying drawings, wherein:

FIG. 1 of the drawing is a cross-sectional view of an optical recording structure in accordance with the invention;

Figure 1:
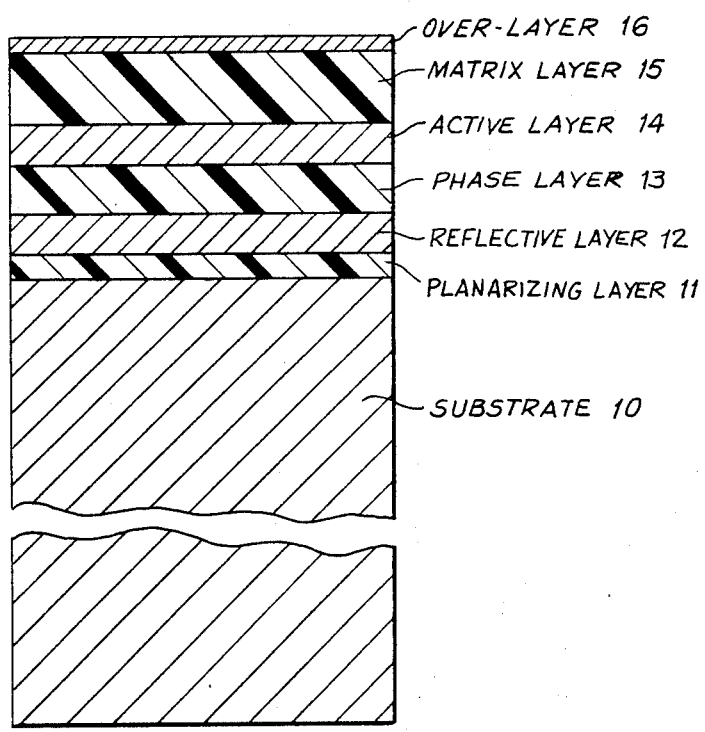

One form of optical storage device, in accordance with the invention, as illustrated in the cross-sectional view of FIG. 1, is comprised of a substrate 10 of, for example, aluminum or a plastic material. The substrate 10 may have a thickness of about 0.075 inches and be in the form of a disk of 14 inches diameter. These parameters are of course not limiting to the present invention.

The surface of the substrate disk 10 conventionally has small imperfections, micro irregularities, tooling marks, polishing streaks, etc., which are undesirable for the optical properties of the recording media, and in order to remove these imperfections, a planarizing layer 11 is preferably provided on at least one surface of the substrate. The planarizing layer may have a thickness of for example 2 to 25 micrometers and may comprise an acrylic layer solvent coated by spin coating. The surface of this layer should have a micro roughness less than 5 nanometers, and may be aluminized for this purpose.

The planarizing layer also serves to prevent corrosion of the substrate, as well as to provide a chemical barrier between residual substrate contamination and the four layer structure of the reflective layer phase layer, active layer and matrix layer, as described in the following paragraphs.

As one example, the planarizing layer has been comprised of Rohm and Haas Acryloid A-10. This material is a solvent base Methyl-Methacrylate thermoplastic resin in a cellosolve Acetate having a viscosity of 800 to 1200 cps (Brookfield 25 degrees C.), 30% plus or minus 1% percent solid, a density of 8.6 lbs. per gallon and a glass transition temperature of the polymer of 105 degrees C. The Acryloid A-10 resin was dissolved in a solution of cellosolve acetate and butyl acetate with a final solvent ratio of 9:1, cellosolve acetate to butyl acetate. The cellosolve acetate was Urethane grade (boiling point of 156.2 degrees C.), and the butyl acetate was spectral grade (boiling point of 126.5 degrees C.). The butyl acetate may be substituted by cellosolve acetate. The solution has a solid content of 22%, and a viscosity of 133 cps (Brookfield at 21 degrees C.).

The planarizing layer provides a base for the reflecting layer 12. The reflecting layer is preferably of aluminum, although copper or silver may alternatively be employed. A thickness of about 100 nanometers is preferred, although this dimension is not critical. It must be highly reflective at the read, write and coarse seek wavelengths employed, for example 633, 830 and 780 nanometers respectively. The reflectivity should be equal to or greater than 0.85 in air, at these wavelengths.

The reflective layer 12 is preferably formed by sputtering onto the planarizing layer, for example employing a Leybold-Heraeus vacuum deposition system.

The next three layers, defining a three layer structure are comprised of a phase layer 13 on the reflective layer, an active layer 14 on the phase layer and a matrix layer 15 on the active layer. The phase layer and matrix layer may be of a plasma polymerized fluorocarbon with a fluorine to carbon atomic ratio of (for example only) 1.8. The active layer may be a tellurium alloy (Te65 Se20 As5 Ni10), identified as STC-68. In response to a write beam (for example a laser beam) the optical energy of the beam is dissipated as thermal energy in the active layer, whereby the active layer agglomerates within the surrounding fluorocarbon phase and matrix layers. This agglomeration affects the optical transmittance of the three layer structure in accordance with the signal modulation of the write beam. At the read wavelength and coarse seek wavelengths the active layer absorbs energy to a different extent in the written and unwritten areas, to develop a reflective contrast.

The phase layer optically adjusts the absorption and reflectivity of the three layer structure at the read, write and coarse seek wavelengths, the phase layer thereby having a tuned thickness to effect destructive interference at the active layer for beams of the read and coarse seek wavelengths, as a result of reflection of these beams at the reflective layer 12. The phase layer 13 also isolates the active layer from the heat sinking effect of the highly conductive reflecting layer, thereby enabling the energy of the write beam to be effectively dissipated in the active layer. In addition, as discussed above the phase layer provides a matrix into which the active layer can be dispersed. The phase layer may have a thickness, for example, of 80 nanometers with an index of refraction of 1.38.

The active layer is a thin layer having discrete island-like globules. The layer therefore has irregular or discontinuous upper and lower surface characteristics defined by the globular surfaces. The mass equivalent average thickness of the active layer is thus about 5 to 8 nanometers. The globules denote discrete particles of dimension averaging within the range of 1 to 8 nanometers. It must be stable chemically, optically and in atomic structure. It has an amorphous lattice structure, with a glass transistion temperature greater than 80 degrees C. The matrix layer 15 may have a thickness of, for example, 270 nanometers.

The fluorocarbon phase layer and fluorocarbon matrix layer are preferably formed by plasma polymerization, and the active layer formed by sputtering, for example employing an inline Leybold-Heraeus vacuum deposition system.

Figure 2:
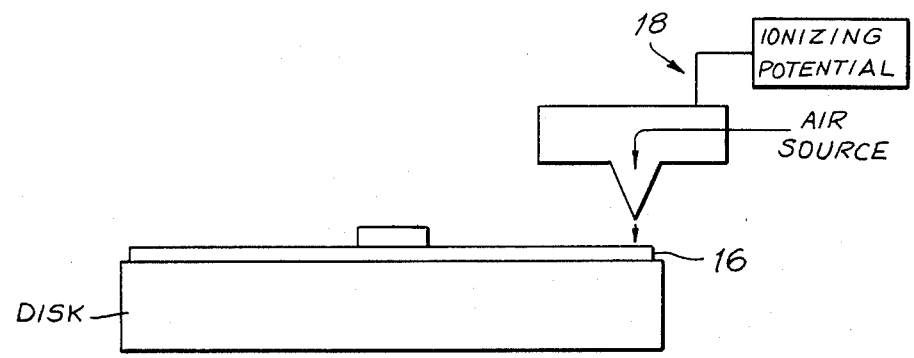
FIG. 2 is a detail of the discharge mechanism.
Figure 3:
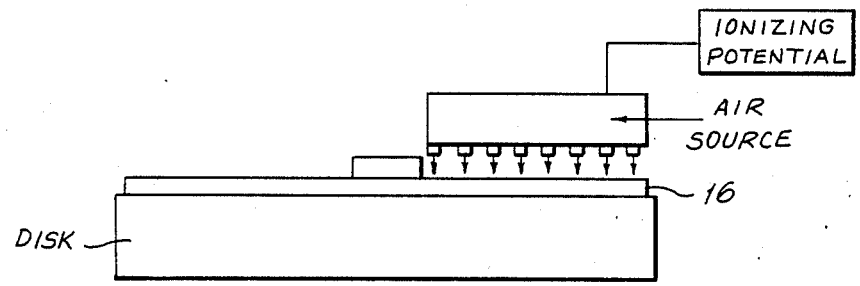
FIG. 3 is an alternative form of FIG. 2.

The dust eliminating over-layer 16 is provided on the matrix layer. The over-layer is transparent to the optical read and write beams, thus allowing access to the active layer. Since a spinning surface would normally build up a static charge, thus attracting dust particles, means are provided to statically discharge the over-layer, to ground or neutral potential. The discharge thus renders the surface at a neutral potential with respect to dust particles and thereby does not attract same. The elimination of a relatively large thick overcoat, made of a plastic material, and substitution of a thin metallic layer, greatly improves the thermal stability of the structure. The discharging means 18, shown in greater detail in FIG. 2, may include a source of ionized particles, directed as a stream, toward the disk surface, thereby removing particles by virtue of the stream pressure, as well as statically discharging the overlayer. The stream may be concentrated (FIG. 2) or shaped as a continuous wide stream (FIG. 3) over the radial surface of the over-layer. An example of an ion stream is a noise free ionization gun employing a shaped discharge area directed to the disk surface.

By way of example, the over-layer can be composed of any material which when desposited is thick enough to be optically transmissive. Also, the index of refraction of the material, together with thickness of the matrix layer and the optical index of refraction of the matrix layer must be considered. As an example, tin oxide ranging in thickness from 20 to 100 nanometers can be used, or an organic conductor such as polyacetylene can also be used.

An optical storage structure as above described in the form of a disk of about 14 inches diameter, is adapted to be rotated at a rate of for example, about 1300 rpm. Writing of data on the disk is effected by a laser beam, at the write frequency, with a diameter of 0.05 plus or minus 0.05 nanometers, the beam having a write power equal to or less then 16 milliwatts. The reading photodetectors are adapted to read spot sizes of about 0.75 nanometers.

As illustrated in the aforementioned copending application Ser. No. 499,666, at the submicroscopic level, the interface between the matrix layer, active layer and phase layer, shows that the discrete globules of the active layer are encapsulated between the fluorocarbon material of the matrix layer and phase layer. This prior application points outs that the mode by which the optical properties of the three layers are varied in response to heat from a laser beam is not known. It is believed at present, however, that the change of optical properties is effected by agglomeration of the material rather than chemical reaction.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. An information storage device in combination with a radiation recording structure, said recording structure comprising:
    (a) a disk shaped substrate for providing support;
    (b) a planarizing layer on said substrate for providing an optically flat surface;
    (c) a reflective layer deposited on said planarizing layer;
    (d) a three layer structure comprised of a fluorocarbon phase layer on said reflective layer, an active layer on said phase layer, and a fluorocarbon matrix layer on said active layer, said active layer being encapsulated between said phase layer and matrix layer, said active layer comprising globules of a tellurium, selenium and arsenic alloy;
    (e) a thin transparent electrically conductive over-layer on said matrix layer, said over-layer being optically transparent to said read and write beams; and
    said information storage device including focused radiation beams for writing and reading on recording structures and comprising:
    (a) neturalizing means for maintaining said overlayer at a neutral electrical potential,
    said recording structure when installed in said information storage device being subject to writing and reading by said focused beams, electrical charges on said over-layer being subject to neutralization by said neturalizing means.

2. The combination of claim 1 wherein said neutralizing means comprises means for directing a conductive particle stream from a point of neutral potential to the surface of said over-layer.

3. The combination of claim 1 wherein said neutralizing means comprises means for directing a dust removing air stream to the surface of the disk.

4. An information storage device in combination with a radiation recording structure, said recording structure comprising:
 (a) a substrate for providing support;
 (b) a multi-layered structure supported on said substrate, said multi-layered structure including at least one active layer subject of modification by said write radiation beam;
 (c) a thin electrically conductive over-layer on said multi-layer structure, said overlayer forming the outer surface of said recording structure, said information storage device including focused radiation beams for writing and reading on recording structures and comprising;
 (a) neutralizing means for maintaining said over-layer at a neutral elecrical potential,
 said recording structure when installed in said information storage device being subject to writing and reading by said focused beams, electrical charges on said over-layer being subject to neutralization by said neutralizing means.

5. The system of claim 4, wherein said neutralizing means is a conductive particle stream directed from a point of neutral potential to the surface of said over-layer.

6. The system of claim 5, wherein said conductive particle stream is a stream of ionized air.

7. The system of claim 4, wherein said neutralizing means provide a dust removing air stream to the surface of the disk.

* * * * *